(No Model.)

J. H. WEAVER.
DRIVE CHAIN.

No. 332,311. Patented Dec. 15, 1885.

Witnesses:
Chas. E. Gaylord.
Frederick Goodwin

Inventor:
James H. Weaver
by Offield and Towle,
Attornies.

UNITED STATES PATENT OFFICE.

JAMES H. WEAVER, OF CHICAGO, ILLINOIS, ASSIGNOR, BY DIRECT AND MESNE ASSIGNMENTS, TO THE EWART MANUFACTURING COMPANY, OF SAME PLACE.

DRIVE-CHAIN.

SPECIFICATION forming part of Letters Patent No. 332,311, dated December 15, 1885.

Application filed July 12, 1883. Serial No. 100,677. (No model.)

*To all whom it may concern:*

Be it known that I, JAMES H. WEAVER, a citizen of the United States, residing at Chicago, in the county of Cook and State of Illinois, have invented certain new and useful Improvements in Drive-Chains Composed of Detachable Links, of which the following is a specification.

My invention relates to an improved form of construction of the links locking or joining together in such drive-chains; and the object which I seek to attain by my new form of construction is to produce a chain that may be easily detached or put together when desired, while at the same time it is not possible for the broken links to spread when the chain is subjected to great strain or lateral pressure.

I have illustrated my invention by the accompanying drawings, forming a part of this specification, in which—

Figure 1:
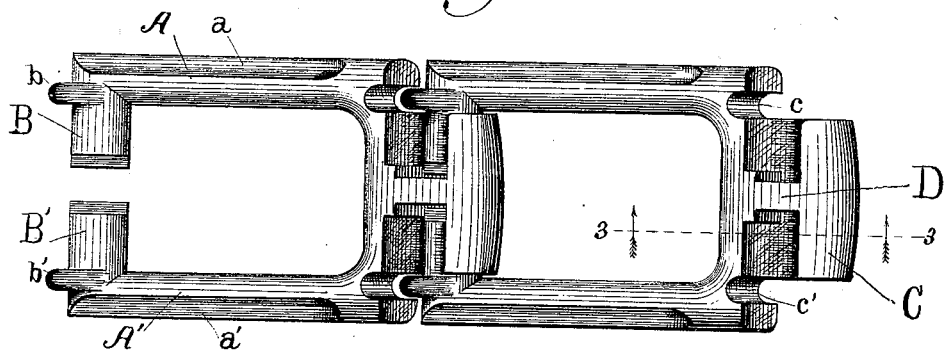
Figure 2:
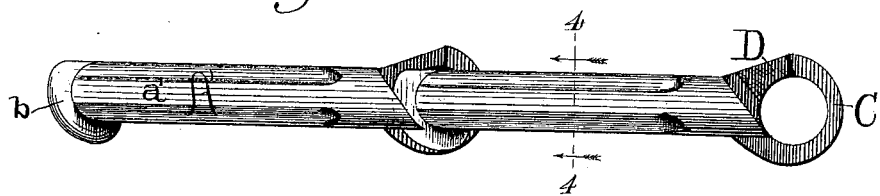
Figure 3:
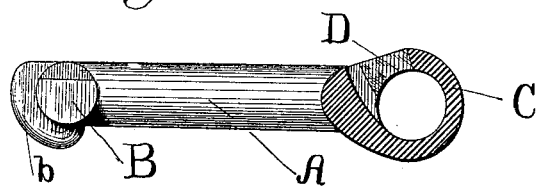
Figure 4:

Figure 1 is a plan of a section of my improved chain. Fig. 2 is an edge view or elevation of a section of my improved chain. Fig. 3 is an elevation of my improved link, showing a section of one end on line 3 3 of Fig. 1. Fig. 4 is a section on line 4 4 of Fig. 2.

Like letters refer to like parts throughout the several views.

A A' are the side bars of said link, having the ribs $a$ $a'$ extending the whole length thereof. B B' are the divided end bars on said link. $b$ $b'$ are ribs or projections on end bars, B B', fitting into corresponding grooves, $c$ $c'$, at the other end of the link. C is the hook, which may or may not be provided with a division-wall or tie-piece, D. $c$ $c'$ are the grooves into which projections $b$ $b'$ interlock when the chain is in use, and by means of which the chain is held together, and which also assist greatly in preventing the spreading of the open end bars when the chain is subjected to a great tensile strain.

I am aware that several methods have been adopted for preventing the spreading or disconnecting of the links in chains of this class; but in every instance, as far as my research has extended, it has been found necessary to have projections on the sides of the links for the purpose of preventing such displacement, or to have an additional end bar inside of said link. In my improved form of construction, by placing the ribs $b$ $b'$ as shown in the drawings accompanying this specification, the said ribs not only hold the chain together, but also add to the strength of the chain in forming a firm base for the divided end bars, B B', thus assisting greatly in preventing the said divided end bars from being straightened. This tendency to straighten is also prevented by the said ribs $b$ $b'$ interlocking or meshing into grooves $c$ $c'$. The ribs $a$ $a'$ on side bars, A A', also assist in preventing the straightening of the divided end bars, as well as to prevent the buckling of the side bar itself.

I do not claim as original or new the method of detaching the said links one from the other, or of constructing the same, as links of this description have been previously patented. I desire, therefore, to limit my application to the use, in a drive-chain of the description shown, of the grooves $c$ $c'$, in connection with the corresponding ribs or projections, $b$ $b'$, these grooves and ribs interlocking with or into each other and strengthening the chain, thus securely locking the chain together, and preventing the spreading, displacement, or disconnection of the open links, combined with the ribs $a$ $a'$, which also assist in preventing the spreading of said divided end bar, and present a smooth and uniform edge without projections or lugs. By this form of construction I am able to have all the links of that form known in the art as "open links," which is of decided advantage, as is evident to all persons familiar with the use of this class of chains, as it is only the open links which perform the functions sought in most instances in this class of chains.

I am aware that lugs on links of drive-chains have been used to engage with recesses on adjoining links in chains formed of links so constructed that there is no tendency of the links to spread under strain, for the purpose of holding the links from becoming detached from each other or of presenting a uniform and unbroken edge when the chain is made up; but I am not aware that lugs and engaging recesses have ever been constructed so as to serve the purpose of preventing the spread of the link or have ever been used with links constructed with open end bars, and

I claim—

A drive-chain link having a divided end bar at one end thereof, a lug mounted on each part of said end bar, a hook with a central rib at the other end and recesses adjoining said hook and outside thereof, corresponding with and adapted to receive the lugs on an adjacent link and engage therewith, whereby spread of the divided end bar under strain is prevented, substantially as described and shown.

JAMES H. WEAVER.

Witnesses:
FREDERICK C. GOODWIN,
HENRY S. TOWLE.